(12) United States Patent
Loo et al.

(10) Patent No.: US 10,350,848 B2
(45) Date of Patent: Jul. 16, 2019

(54) NITRILE/POLYURETHANE POLYMER BLENDS

(71) Applicant: Ansell Limited, Richmond, Victoria (AU)

(72) Inventors: Liong Yu Loo, Selangor (MY); Kwee Feng Hin, Selangor (MY); Karunagaran A/L Arumugam, Selangor (MY); Kim Soon Fam, Kuala Lumpur (MY); Siew Bee Neoh, Selangor (MY)

(73) Assignee: Ansell Limited, Victoria (AU)

( * ) Notice: Subject to any disclaimer, the term of this patent is extended or adjusted under 35 U.S.C. 154(b) by 684 days.

(21) Appl. No.: 14/550,235

(22) Filed: Nov. 21, 2014

(65) Prior Publication Data

US 2015/0143608 A1    May 28, 2015

Related U.S. Application Data

(60) Provisional application No. 61/908,808, filed on Nov. 26, 2013.

(51) Int. Cl.
*A41D 19/00* (2006.01)
*B29D 99/00* (2010.01)
*A41D 19/015* (2006.01)

(52) U.S. Cl.
CPC ..... *B29D 99/0067* (2013.01); *A41D 19/0065* (2013.01); *A41D 19/01505* (2013.01); *A41D 2400/80* (2013.01); *A41D 2500/50* (2013.01); *A41D 2500/54* (2013.01)

(58) Field of Classification Search
None
See application file for complete search history.

(56) References Cited

U.S. PATENT DOCUMENTS

| | | | | |
|---|---|---|---|---|
| 3,404,409 A | * | 10/1968 | Tillotson | A41D 19/01547 2/161.8 |
| 5,084,514 A | | 1/1992 | Szczechura et al. | |
| 5,203,884 A | | 4/1993 | Buchanan et al. | |
| 6,019,922 A | * | 2/2000 | Hassan | A41D 19/0058 264/130 |
| 6,347,409 B1 | * | 2/2002 | Nile | C08C 1/15 2/161.7 |

(Continued)

FOREIGN PATENT DOCUMENTS

WO    WO-0190236 A1    11/2001
WO    WO-201214917 A1    11/2012

OTHER PUBLICATIONS

"EN 388". Guide—The Right Gloves. URL=http://www.guide.eu/en/info/EN/en388.html. Indexed/published by Google date—Nov. 18, 2009.*

(Continued)

*Primary Examiner* — Jameson D Collier
(74) *Attorney, Agent, or Firm* — Moser Taboada

(57) ABSTRACT

A glove that includes a polymeric, elastomeric, or latex composition including a blend of a polyurethane material, an acrylonitrile-butadiene material and an ethylene vinyl acetate material; at least one of a carnauba or a modified polyethylene wax; and hard filler particles having a hardness greater than 4 Mohs or more, thereby increasing the abrasion-resistance and/or cut-resistance of the glove, is disclosed.

16 Claims, 8 Drawing Sheets

(56) References Cited

U.S. PATENT DOCUMENTS

| | | | |
|---|---|---|---|
| 6,395,656 B1* | 5/2002 | Jin | A41D 19/01558 2/159 |
| 6,591,427 B1* | 7/2003 | Bennett | A41D 19/01529 2/161.6 |
| 7,048,884 B2* | 5/2006 | Woodford | B29C 41/003 264/255 |
| 7,247,676 B2 | 7/2007 | Morgan et al. | |
| 7,449,131 B2 | 11/2008 | Hayner et al. | |
| 7,850,870 B2 | 12/2010 | Ahn et al. | |
| 8,258,219 B2 | 9/2012 | Shimada et al. | |
| 2001/0053820 A1 | 12/2001 | Yeager et al. | |
| 2004/0127614 A1 | 7/2004 | Jiang et al. | |
| 2006/0141165 A1 | 6/2006 | Hassan et al. | |
| 2007/0010702 A1 | 1/2007 | Wang et al. | |
| 2007/0017160 A1 | 1/2007 | Caldwell et al. | |
| 2007/0207186 A1 | 9/2007 | Scanlon et al. | |
| 2008/0233062 A1 | 9/2008 | Krishnan | |
| 2009/0007313 A1 | 1/2009 | Boorsma et al. | |
| 2009/0042166 A1 | 2/2009 | Craig et al. | |
| 2010/0028436 A1* | 2/2010 | Ohrlander | A61L 15/18 424/487 |
| 2010/0160079 A1* | 6/2010 | Kim | A63B 45/00 473/373 |
| 2010/0275342 A1* | 11/2010 | Sweeney | A41D 19/01505 2/167 |
| 2010/0301286 A1 | 12/2010 | Dittmar et al. | |
| 2011/0189440 A1 | 8/2011 | Appleby et al. | |
| 2011/0265246 A1 | 11/2011 | Saito | |
| 2011/0287553 A1* | 11/2011 | Hassan | B32B 33/00 436/164 |
| 2013/0152273 A1* | 6/2013 | Hassan | A41D 19/0055 2/168 |

OTHER PUBLICATIONS

International Preliminary Report on Patentability dated May 31, 2016 and Written Opinion dated Feb. 26, 2015 for PCT Application No. PCT/AU2014/001073.

* cited by examiner

NITRILE/POLYURETHANE POLYMER BLENDS

CROSS-REFERENCE TO RELATED APPLICATIONS

This application claims the benefit of priority to U.S. Provisional Application Ser. No. 61/908,808, filed Nov. 26, 2013, which is incorporated in its entirety.

BACKGROUND

Field of the Invention

Embodiments of the present invention generally relate to polymer blends. More specifically, embodiments of the invention relate to polymer blends comprising polyurethane, acrylonitrile-butadiene materials, and/or an ethylene vinyl acetate material, at least one wax, and fillers for abrasion resistant thin coatings.

Description of the Related Art

Industrial gloves used in hand protection are generally available in two forms: supported, where the glove comprises a liner that is partially or fully coated with an elastomeric material to form a barrier layer, or unsupported, where the glove is formed of the elastomeric material and no liner is used. The liner may be a knitted fabric, a cut and sewn woven fabric or a combination of fabrics. Unsupported gloves are commonly used in material handling and light assembly conditions, as well as for more demanding applications, including industrial, household, and construction industries in situations where hands need protection from contacting the materials being handled. Supported gloves find use in more demanding industrial situations in which the liner can be tailored to provide cut resistance throughout the glove and breathability in the exposed fabric areas, yet has a protective barrier in the coated area. Gloves having enhanced abrasion-resistance protect the hands of users and promote the service life of the glove. In addition, supported and unsupported gloves having enhanced grip properties are desirable.

Moreover, flexible gloves that are comfortable are desirable and, accordingly, gloves having thin coatings are particularly desirable. However, during use, flexible, thinly coated gloves wear out from abrading in areas receiving the most friction, such as the finger tips and the palm.

Therefore, thin, lightweight, flexible, supported and unsupported gloves comprising a polymeric material having improved abrasion-resistant and/or grip properties represent advances in the art.

SUMMARY

Embodiments according to the present invention include a glove having a polymeric, elastomeric, or latex composition including a blend of a polyurethane material, an acrylonitrile-butadiene material and an ethylene vinyl acetate material; at least one of a carnauba or a modified polyethylene wax; and hard filler particles having a hardness greater than 4 Mohs or more, thereby increasing the abrasion-resistance and/or cut-resistance of the glove, for supported and unsupported gloves, substantially as shown in and/or described in connection with at least one of the figures, as set forth more completely in the claims, are disclosed. Various advantages, aspects, and novel features of the present disclosure, as well as details of an exemplary embodiment thereof, will be more fully understood from the following description and drawings.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1C:
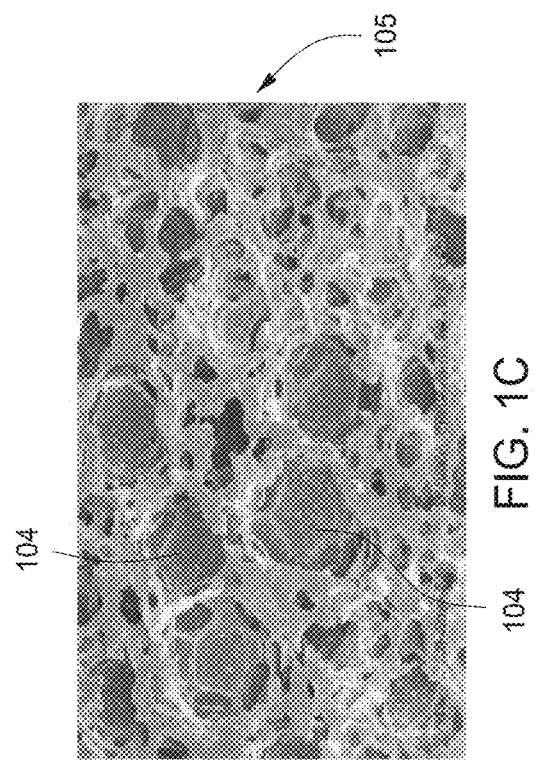
FIGS. 1A-1D depict SEM micrographs of delayed collapsed foams and immediate collapsed foams that form textured surfaces, according to embodiments of the invention.

While the invention described herein depicts several exemplary embodiments and drawings, those skilled in the art will recognize that the invention is not limited to the embodiments or drawings solely as described. It is to be understood that the drawings and detailed description are not intended to limit the invention to the particular form disclosed, rather, the invention is to cover all modifications, equivalents and alternatives falling within the spirit and scope of the present invention as defined by the appended claims. Headings used herein are for organizational purposes only and are not to limit the scope of the description or claims. Also, the word "may" is used in a permissive sense, meaning having the potential to, rather than the mandatory sense, i.e., meaning must. Similarly, the words "include," "including," and "includes" mean including, but not limited to. The word "glove" means glove or glove liner. Also, the terms layer and coating are used interchangeably herein as are the terms latex, elastomeric, and polymeric.

DETAILED DESCRIPTION

Embodiments according to the present invention generally relate to polymeric, elastomeric, or latex compositions comprising nitrile-butadiene and/or polyurethane and/or ethylene vinyl acetate composition blends, further including particle fillers and waxes as discussed below. The elastomeric compositions, which may be foamed or unfoamed, can be used to make, for example, a dipped, unsupported glove or a coating for a supported glove that includes a fabric liner. Supported gloves comprise a fabric liner formed from at least one yarn; at least one polymeric, elastomeric, or latex composition, according to the invention and adhered to at least a portion of the fabric liner. For both supported and unsupported gloves, the elastomeric composition comprises at least one wax, and at least one hard filler particle having a hardness greater than the hardness of the elastomeric coating.

Because polymeric compositions according to the present invention comprise at least a filler particle having a hardness greater than the hardness of an unfilled elastomeric coating, the particles are effective to increase the cut- and/or abrasion-resistance, as well as grip performance, of the elastomeric coating formed from the polymeric compositions. The filler particles can have a Mohs hardness value of 3 Mohs or more, wherein the filler particles may have a diameter of 0.1 to 10 microns. Embodiments according to the invention further comprise a polymeric, elastomeric, or latex coating having, for example, 2-10% by weight of hard filler particles. A glove comprising the cut-resistant knitted liner having a polymeric, elastomeric, or latex coated surface, can have an EN cut resistance Index of 3 or higher, and an average abrasion-resistance of EN Index of 4 or higher.

At least one exemplary embodiment according to the present invention comprises a polymeric, elastomeric, or latex composition as shown below, which contains a polyurethane premix, an aqueous, colloidal dispersion of a carboxylated butadiene-acrylonitrile copolymer with, optionally, a high acrylonitrile level, and a stabilized, aqueous, colloidal dispersion of carboxylated butadiene-acrylonitrile copolymer with a high acrylonitrile level, containing an emulsifier system and/or ethylene vinyl acetate.

The polymeric, elastomeric, or latex compositions, in accordance with the present invention, further comprise various additives, fillers, and processing aids. Some compositions contain a carnauba wax, such as Michem Lube 156 and the like, others contain alloy waxes, such as a modified polyethylene wax, for example, Ceraflour 929 and/or Aquamat 272 and/or the like, while still other compositions contain a combination of both carnauba waxes and modified polyethylene waxes to improve the abrasion resistance of the polymeric, elastomeric, or latex coatings formed therefrom. Also, surfactants and de-foaming agents may also be used, such as Surfynol 465, for unsupported gloves. Embodiments according to the invention further include vulcanizing agents and activators, such as zinc oxide, or thickeners, such as Rohagit SD-15, as are known to those of skill in the art. The hard filler particles, such as boron carbide and/or silicon carbide and/or, aluminum potassium silicates, such as mica, and/or aluminum oxide may be employed to improve the abrasion resistance of coatings formed from the polymeric, elastomeric, or latex compositions.

At least one embodiment, according to the invention, comprises an unsupported glove having a polymeric, elastomeric, or latex composition including a blend of a polyurethane material, an acrylonitrile-butadiene material and an ethylene vinyl acetate material, at least one of a carnauba or a modified polyethylene wax, and hard filler particles having a hardness greater than 4 Mohs or more, thereby increasing the abrasion- and/or cut-resistance of the polymeric, elastomeric, or latex composition. Optionally, the unsupported glove may be dressed on and adhered to a glove shaped knitted liner to form a supported glove. Also, supported gloves according to the invention comprise a polymeric, elastomeric, or latex composition including a blend of a polyurethane material, an acrylonitrile-butadiene material and an ethylene vinyl acetate material, at least one of a carnauba or a modified polyethylene wax, and hard filler particles having a hardness greater than 4 Mohs or more, which is disposed, for example, by dipping a fabric liner into the polymeric, elastomeric, or latex composition to form a supported glove.

A first exemplary embodiment according to the present invention comprises a polymeric, elastomeric, or latex composition as shown in Table 1, which can be used for manufacturing, for example, a coating for a foamed supported glove and/or a supported glove having at least two polymeric layers disposed as coatings on a fabric liner.

A second exemplary embodiment according to the present invention comprises a polymeric, elastomeric, or latex composition as shown in Tables 2 and 4, which can be used for manufacturing, for example, a coating for an unlined and/or unsupported glove.

A third exemplary embodiment according to the present invention comprises a polymeric, elastomeric, or latex composition as shown in Tables 2, 3, and 4 which can be used for manufacturing, for example, a coating for a foam-lined unsupported glove.

TABLE 1

| Type of component | Component used | Composition (% by weight) |
|---|---|---|
| Synthetic latex polymer | Carboxylated butadiene-acrylonitrile latex | 91-98 |
| Synthetic latex polymer | Polyurethane | 1-5 |
| Synthetic latex polymer | Ethylene vinyl acetate | 1-4 |
| Stabilizer | Sodium salts and/or ethoxylated nonphenol/ethoxylated tridecyl alcohol | 0.1-1.0 |
| Surfactant | Acetylenic diol | 0.1-10 |
| Curative Agents | Cure package | 1-10 |
| Hard Filler Particles | boron carbide/mica/aluminum oxide/ silicon carbide | 2-10 |
| Pigment | Carbon black and/or C.I. pigment blue | 0.1-5 |
| Wax | Carnauba and/or modified PE wax | 5-25 |
| Thickener | Polyacrylate/methacrylic acid-acrylic ester copolymer/cellulose ether | 0.2-10 |

In some exemplary embodiments according to the invention, the polymeric, elastomeric, or latex composition for an unsupported glove comprises, for example, the composition of Table 2, along with other thickeners, waxes, pigments, and the like. The polymeric compositions of Table 2 may be useful for both delayed and immediate collapsed foams, as discussed above.

TABLE 2

| Type of component | Component used | Composition (% by weight) |
|---|---|---|
| Synthetic latex polymer | Carboxylated butadiene acrylonitrile latex | 91-98 |
| Synthetic latex polymer | Polyurethane | 1-5 |
| Synthetic latex polymer | Ethylene vinyl acetate | 1-4 |
| Stabilizer | Sodium salts | 0.1-1.0 |
| Surfactant | Acetylenic diol | 1-10 |

TABLE 2-continued

| Type of component | Component used | Composition (% by weight) |
|---|---|---|
| Curative Agents | Cure package | 1-10 |
| Pigment | Carbon black and/or Phathalocyanine blue | 1-5 |
| Wax | Carnauba and/or modified PE wax | 5-25 |
| Thickener | Polyacrylate/methacrylic acid-acrylic ester copolymer/cellulose ether | 0.2-10 |

The absence of a de-foaming agent in compositions according to the invention slows the foam collapse process, while the addition of a de-foaming agent, such as an acetylenic diol, or others, aids in producing an immediate collapsed foam. At least one exemplary embodiment includes the addition of a surfactant as a de-foaming agent in compositions according to the invention, in amounts, for example, 1.5% by weight of the composition.

Without intending to be bound by theory, we have surprisingly found that a synergy exists between the physical interaction between wax and boron carbide and/or boron nitride and/or silicon carbide and/or mica and/or aluminum oxide particles in the rubber matrix system created by the gelling of the polymeric composition, resulting in a coating having enhanced abrasion resistance. The modified polyethylene wax has a melting point at approximately 115° C. while boron carbide ($B_4C$) has a very high melting point, on the order of 2450° C., while the boron nitride has a melting point of approximately 2950° C. Mica has a high melting point of approximately 1100° C. During drying and curing of the coating in the oven zones at a temperature profile from 115 to 140° C., it is believed that the modified polyethylene wax starts to melt and fill up the pores, or channels, created by and between the boron carbide and/or mica particles (or other hard filler particles as discussed herein), which are irregular in shape (as discussed below) and have a submicron particle size ranging from 0 to 10 microns, in the acrylonitrile-butadiene rubber (NBR) matrix. The enhanced abrasion resistance is attributed to the rubber-filler-wax interphase interaction, i.e., three types of interphase interactions among NBR rubber, boron carbide and/or mica and modified polyethylene wax. Also, the melted wax physically bridges the air gap created between NBR rubber and boron and/or mica particles, creating a physical binding power among NBR rubber, boron and/or mica particles, and modified polyethylene wax. The binding of the matrices is believed to produce additional and stronger inter- and intramolecular bonding, leading to a polymeric coating having enhanced abrasion resistance.

We have also surprisingly discovered that a point of diminishing returns exists with respect to the amount of boron carbide within compositions versus the expected physical properties of a coating made therefrom. For example, although boron carbide is used because it is an inert and hard material having very high thermal stability and acts as a reinforcement filler to improve abrasion-resistance, based on our observations, the reinforcement/abrasion resistance phenomenon of a polymeric composition reaches a saturation point at approximately 10% by weight and no significant increase in abrasion performance for compositions containing greater than 10% by weight was observed. Therefore, the synergy in abrasion resistance created by the combination of the modified polyethylene wax and the boron carbide and/or mica particles creates a competitive advantage at 2-10% by weight of filler because of the high cost of boron carbide. In at least one exemplary embodiment according to the invention, a composition contains 5% by weight of boron carbide.

Embodiments according to the invention include a foamed polymeric, elastomeric, or latex composition, containing at least one hard filler particle, such as boron carbide, wherein the composition is foamed using well-dispersed air cells in a range of 1 to 50 volumetric percent, forming closed cells or open cells with interconnected porosity in the coating. Methods for incorporating foamed compositions having air contents between, for example, 1-50% are described in Woodford et al., U.S. Pat. No. 7,048,884, which is incorporated herein in its entirety.

Embodiments according to the invention comprise gloves having a polymeric, elastomeric, or latex coating having a collapsed foamed structure. The collapsed foamed structure may be a "delayed" collapse or an "immediate" collapse, either of which is desirable for specific applications. An immediate collapsed foam is characterized by smaller bubble sizes, as discussed below. A delayed collapsed foam is characterized by larger bubble sizes, as discussed below. Both are manufactured using similar process steps as discussed below.

The delayed foam collapse process occurs because the polymeric, elastomeric, or latex composition lacks the addition of de-foaming agent. The formation of a delayed foam collapse structure begins at approximately 30 seconds, at which time bubbles start to collapse on the surface of the coating being formed. After approximately 2 to 5 minutes, a fully collapsed structure is achieved. Also, the timing for foam collapse to occur is also affected by total solids content (TSC) of the composition of the latex mix compound. The TSC of the polymeric, elastomeric, or latex composition of Table 1 for unsupported gloves is approximately 23.5%. It is noted that the lower the TSC, the faster the foam collapses. However, there is a limit in lowering the TSC because too low a TSC or too diluted a polymeric, elastomeric, or latex composition exhibits processability and coating performance issues. Therefore, the use of a surfactant and/or de-foaming agent to speed up the foam-collapse timing is employed, particularly for compositions having lower TSC.

For the immediate foam collapse structure, foam collapse occurs immediately after the polymeric, elastomeric, or latex composition withdrawal with the addition of the surfactant and/or de-foaming agent into the polymeric, elastomeric, or latex composition. The collapse of the foam structure starts immediately, as quickly as one second and reaching a fully collapsed structure at approximately 3 to 5 seconds, i.e., the small bubbles start to collapse instantly and achieve a fully collapsed structure after a very short time and set the foam cells without further collapsing, therefore, preventing small bubbles from bursting into each other and becoming bigger bubbles. Whereas, for the delay foam collapse process, no bubbles at the surface occur until after approximately 5-10 seconds. After approximately 30 seconds, bubbles have already started to burst inside and combine into larger bubbles before achieving a fully collapsed structure and set at larger bubble sizes after approximately 2 to 5 minutes. Therefore, bubble sizes are larger for the delayed foam collapse process.

Figure 1D:
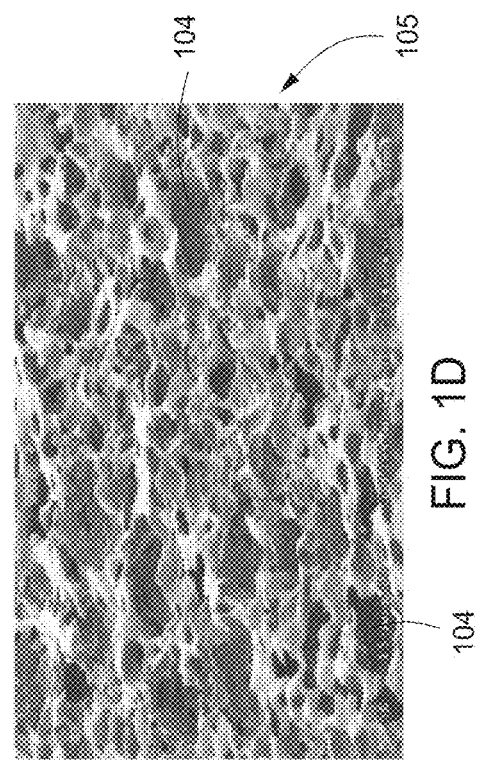
Figure 1A:
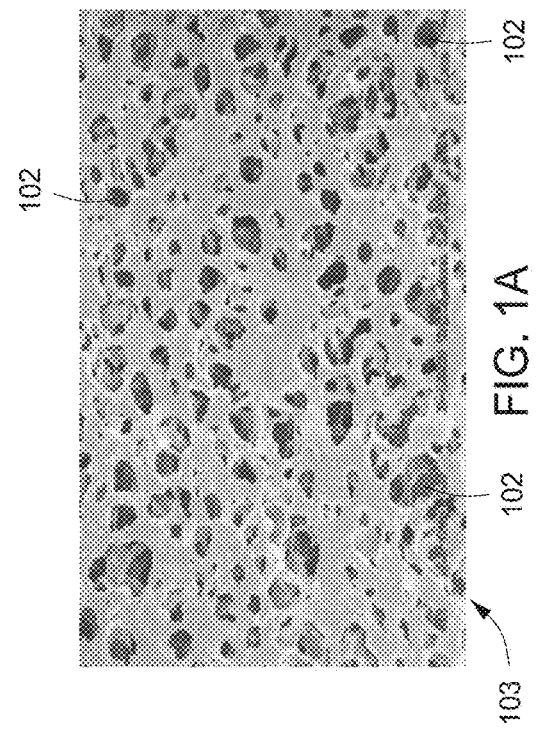
Figure 1B:
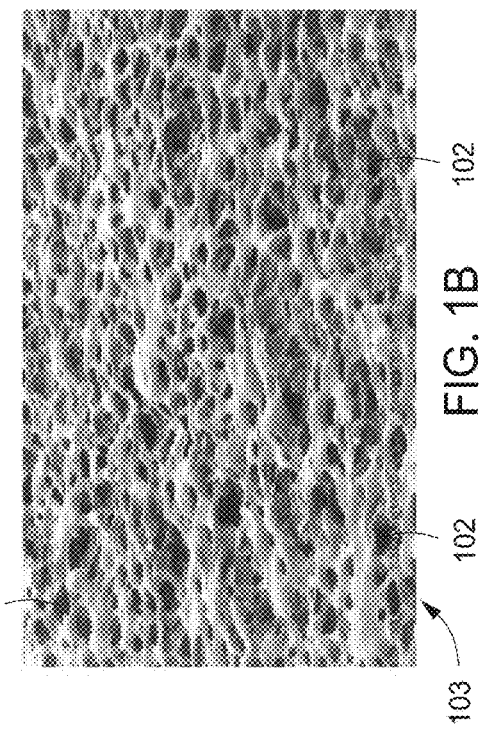

FIGS. 1A-1D depict SEM micrographs of delayed collapsed foams and immediate collapsed foams that form textured surfaces, according to embodiments of the invention. FIG. 1A depicts a plan view of an immediate collapsed foam structure having smaller bubbles 102 that form a texturized top surface 103. The bubbles are approximately 0.01-0.40 mm in size. FIG. 1B depicts a perspective view taken from a 60 degree angle from the horizontal, showing bubbles 102 that form the texturized top surface 103. FIG. 1C depicts a plan view of a delayed collapsed foam structure having large bubbles 104 that form a texturized top surface 105. The bubbles are approximately 0.07-0.70 mm in size. FIG. 1D depicts a perspective view taken from a 60 degree angle from the horizontal, showing bubbles 104 that form the texturized top surface 105. The textured surfaces shown in FIGS. 1A-1D start as bubbles that collapse and are subsequently cured.

Figure 2:
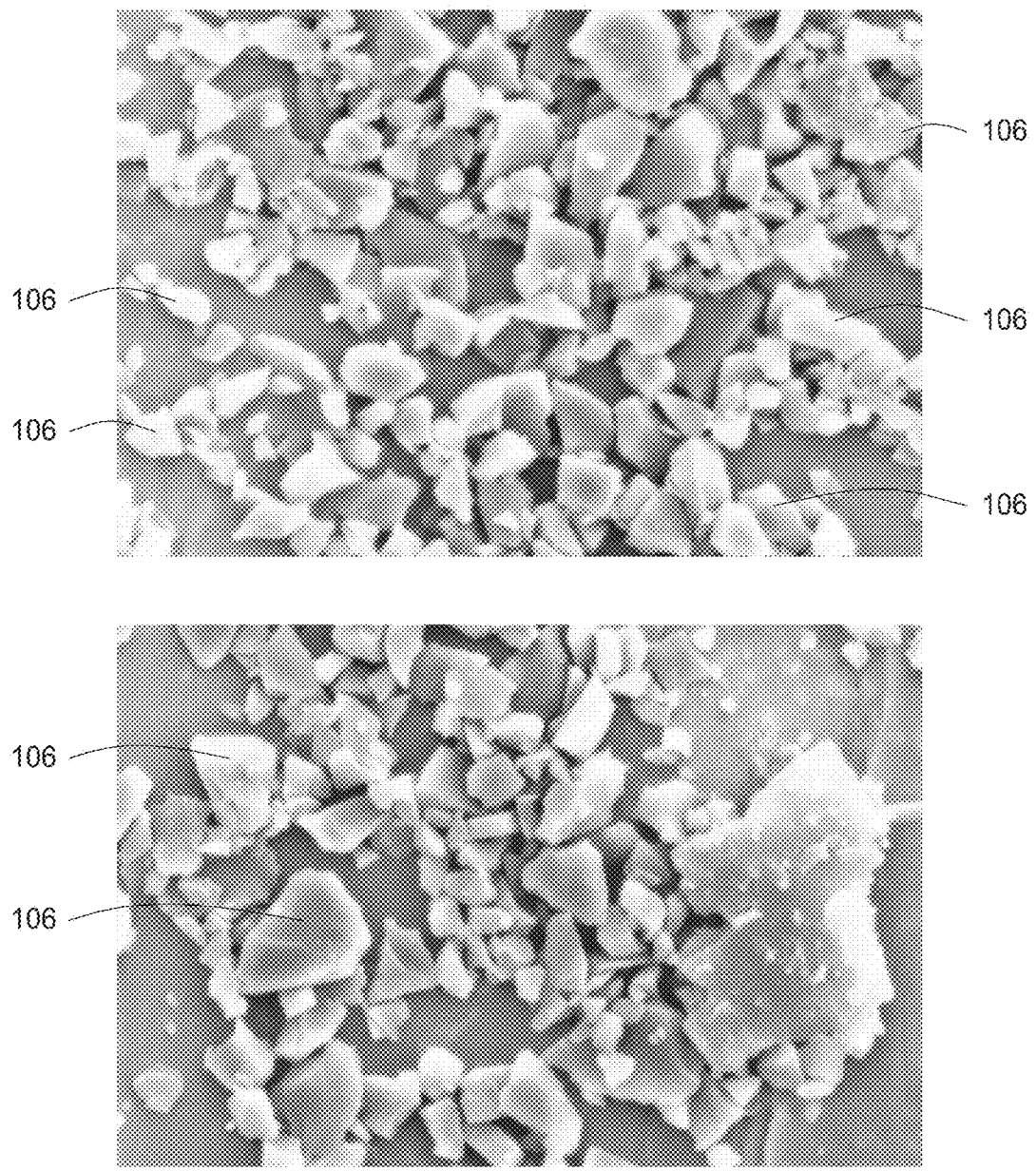
FIG. 2 depicts SEM images of a dispersion of irregularly-shaped boron carbide particles used in embodiments according to the invention.

FIG. 2 depicts SEM images of a dispersion of hard particles 106, such as irregularly-shaped boron carbide particles, used in embodiments according to the invention. In some embodiments, the particles 106 have an average diameter of 0.1 to 10 microns. As shown, in the SEM at 2000 magnification power, the particles are substantially all of irregular-shape, i.e., not spherical or cubed, and are of varying size. The particles 106 can have hardness values of 3 Mohs or higher, including 8 or 9 Mohs or higher. In certain embodiments, the amount of filler particles is 2.5-5% by weight or higher, or 5-10% by weight or higher or 10-15 or 15% by weight or higher. In certain embodiments, the amount of hard filler particles is 20% by weight or lower. In at least one exemplary embodiment, a polymeric, elastomeric, or latex coating comprising a blend of polyurethane and acrylonitrile-butadiene material further comprises between 2.5-5% by weight hard filler particles of boron carbide.

Figure 3:
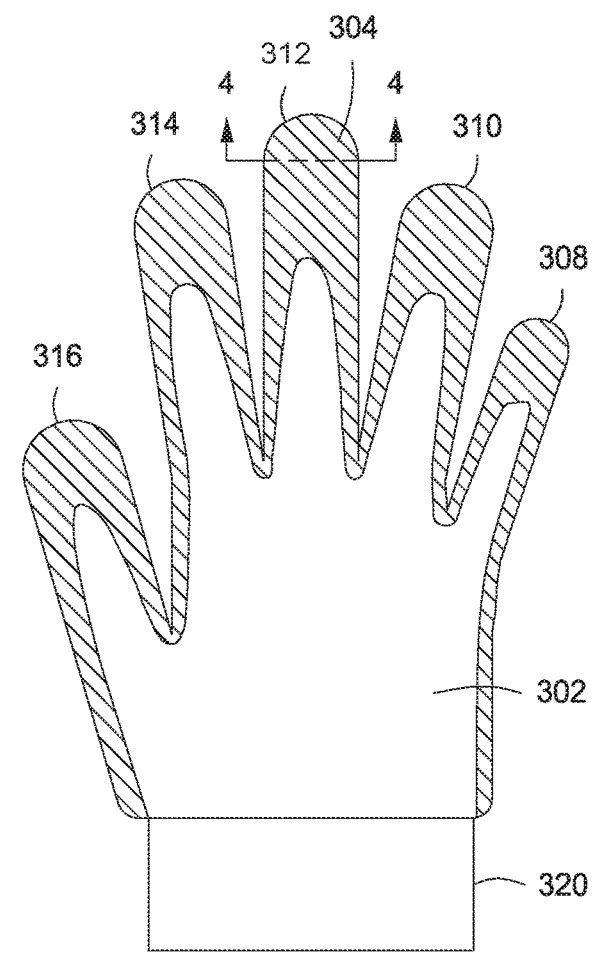
FIG. 3 depicts a knitted liner and a polymeric coating disposed thereon to form a supported glove, according to embodiments of the invention.

FIG. 3 depicts a knitted liner 302 and a polymeric coating 304 disposed thereon to form a supported glove 300, according to embodiments of the present invention. The knitted liner 302 can be comprise several sections, including four sections for each of the finger components 308, 310, 312, 314, and the thumb 316, and a wrist section 320. Technologies for knitting each section for each of the components can be knit on a knitting machine, such as manufactured by Shima Seiki Mfg., Inc., and requires programming of the machine for each of the different sections. The knitted liner 302 may be configured in a manner described in commonly assigned U.S. Patent Application Publication Number 2009/0211305, incorporated herein by reference in its entirety. The illustrated sections include fingers or portions of the palm or wrist, but other sections can be selected and programmed based on improving the fit of the glove over a uniformly stitched liner, such as a knitted seamless liner.

In some embodiments, a fabric liner, for example, an 18-gauge knitted liner with nominally 140 denier nylon 66 yarn is dressed on a hand shaped former (e.g., ceramic or metallic) and is immersed in a coagulant before the coating, as discussed above, is applied. For example, weak acids, such as aqueous solutions of acetic acid, formic acid, or tricarboxylic acid, and the like, described in commonly-assigned U.S. patent application Ser. No. 13/928,615, which is herein incorporated by reference in its entirety, make good coagulants because such coagulants prevent strike-through. In other embodiments, the coagulant comprises a strong coagulant, such as a 2-15 wt % calcium nitrate or calcium citrate aqueous solution. The calcium nitrate or calcium citrate coagulant solution penetrates the thickness of the knitted liner, in some embodiments, the entire thickness of the liner. When the coagulant coated liner contacts a polymeric, elastomeric, or latex composition, it destabilizes the composition and gels the composition, forming a coating. In at least one embodiment of the invention, the polymeric, elastomeric, or latex composition is formed by mixing an aqueous polymeric, elastomeric, or latex composition with an aqueous dispersion of filler particles. The coagulant coated knitted liner dressed on the former is dipped in the polymeric, elastomeric, or latex composition, forming a coating. The coated knitted liner is then washed and heated to form a cured glove. The cured glove is washed again to remove coagulant salts and other processing chemicals. In certain embodiments, the yarn has a denier in a range from approximately 70 to 221. In other embodiments, the yarn has a denier ranging from 221-400 and is knitted using 13- or 15-gauge needles on a knitting machine, as discussed above. Weak and/or strong coagulants may be disposed on an undressed former or a former dressed with a liner.

Figure 4:
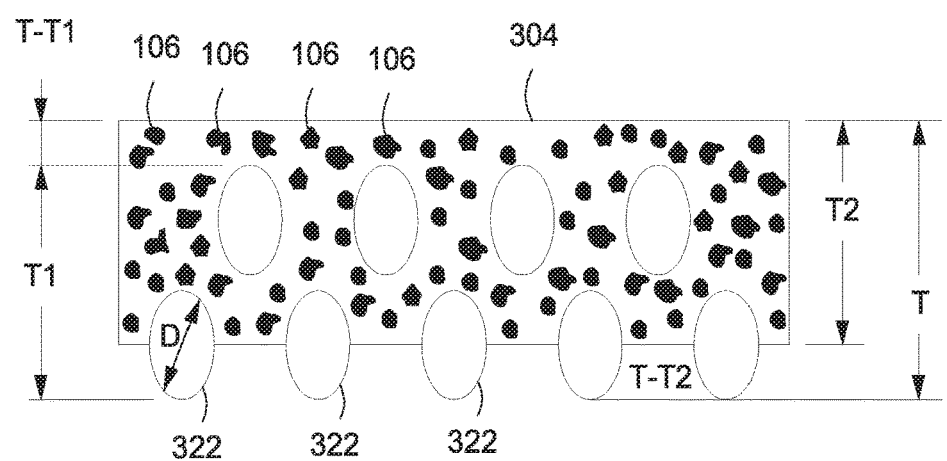
FIG. 4 depicts a schematic representation of a cross section taken along line 4-4 of the supported glove of FIG. 3, according to embodiments of the invention.

FIG. 4 depicts a schematic representation of a cross section taken along line 4-4 of the supported glove of FIG. 3, in accordance with embodiments of the invention. The knitted liner 302 having the polymeric, elastomeric, or latex coating 304 penetrating halfway or more through the thickness of the coated, knitted liner 302 is shown. The polymeric, elastomeric, or latex coating 304, according to the invention, comprises hard filler particles 106 to improve the abrasion resistance and the cut resistance of the coating 304 or any article, such as a glove, on which the polymeric, elastomeric, or latex coating 304 is disposed. The polymeric, elastomeric, or latex coating 304 may be natural rubber latex, synthetic rubber latex, or the like. The synthetic rubber latex may be selected, for example, from Table 1, 2, 3 or 4 and may further comprise other grades of polyurethane, carboxylated acrylonitrile-butadiene, non-carboxylated acrylonitrile-butadiene, polyisoprene, polychloroprene, styrene-butadiene, polybutadiene, ethylene vinyl acetate, and/or combinations thereof. In at least one embodiment according to the invention, the polymeric, elastomeric, or latex coating 304 may have commonly used stabilizers such as potassium hydroxide, ammonia, sulfonates, ethyoxylated alcohols, and/or the like. Furthermore, in at least one embodiment, the polymeric, elastomeric, or latex coating 304 may contain other commonly used ingredients such as surfactants, anti-microbial agents, fillers/additives, de-foaming agent, pigments, waxes, thickeners, matting agents, curative agents and the like. Moreover, embodiments of the invention comprise the polymeric, elastomeric, or latex composition having a viscosity in the range of 20-8000 centipoises and a TSC of 20-45%, which include any of the formulations of Tables 1-4.

FIG. 4 also depicts the knitted liner with a polymeric, elastomeric, or latex coating penetrating halfway or more through the thickness of the knitted liner. The arrangement of yarns 322 in the knitted liner 302 and its relationship to the polymeric, elastomeric, or latex coating 304 which may be foamed or unfoamed, and containing filler particles 106, is illustrated. The yarns 322, average diameter D, are knitted in the liner, producing a liner with a thickness T1. A polymeric, elastomeric, or latex coating 304 of thickness T2 penetrates the knitted liner 302 producing an overall glove thickness T. For at least a portion of the knitted liner 302, on average the distance defined by T-T2 is not penetrated by the polymeric, elastomeric, or latex coating 304 and the degree of penetration is defined by the ratio (T−T2)/T1, as is described in commonly-assigned US Patent Publ. No. US/2007/0204381, which is incorporated herein in its entirety. In at least one embodiment, the polymeric, elastomeric, or latex coating 304 is applied in a manner such that it covers at least a portion of the knitted liner 302 but does not penetrate the knitted liner 302 to contact the skin of the wearer. In some embodiments according to the invention, there is substantially no such penetration (any such penetrations are so insubstantial that they are not felt by most users). The polymeric, elastomeric, or latex coating 304 can be applied by dipping the knitted liner 302 into the polymeric, elastomeric, or latex composition, such as in the form of an aqueous polymeric latex emulsion, or by spraying the polymeric, elastomeric, or latex coating 304 onto the knitted liner 302. In at least one embodiment, an aqueous dispersion of hard filler particles 106 is mixed with an aqueous polymeric, elastomeric, or latex composition, such that the hard filler particles 106 are distributed throughout the composition.

In some embodiments of the invention, the hard filler particles 106 mixed into the polymeric, elastomeric, or latex coating 304 comprise, for example, boron carbide, boron nitride, silicon carbide and the like. In some embodiments, the polymeric composition disposed as a polymeric layer or coating on the abrasion resistant glove 100 contains 15% by weight of hard filler particles. Although the exemplary particles comprise very high melting point hard filler particles, such as boron carbide, boron nitride, and/or silicon carbide, other particles may be used. To provide abrasion resistance, the particles have a hardness that is greater than the hardness of the elastomeric coating, as is disclosed in commonly-assigned international patent application PCT/US2012/035228, which is incorporated by reference in its entirety.

Figure 5:
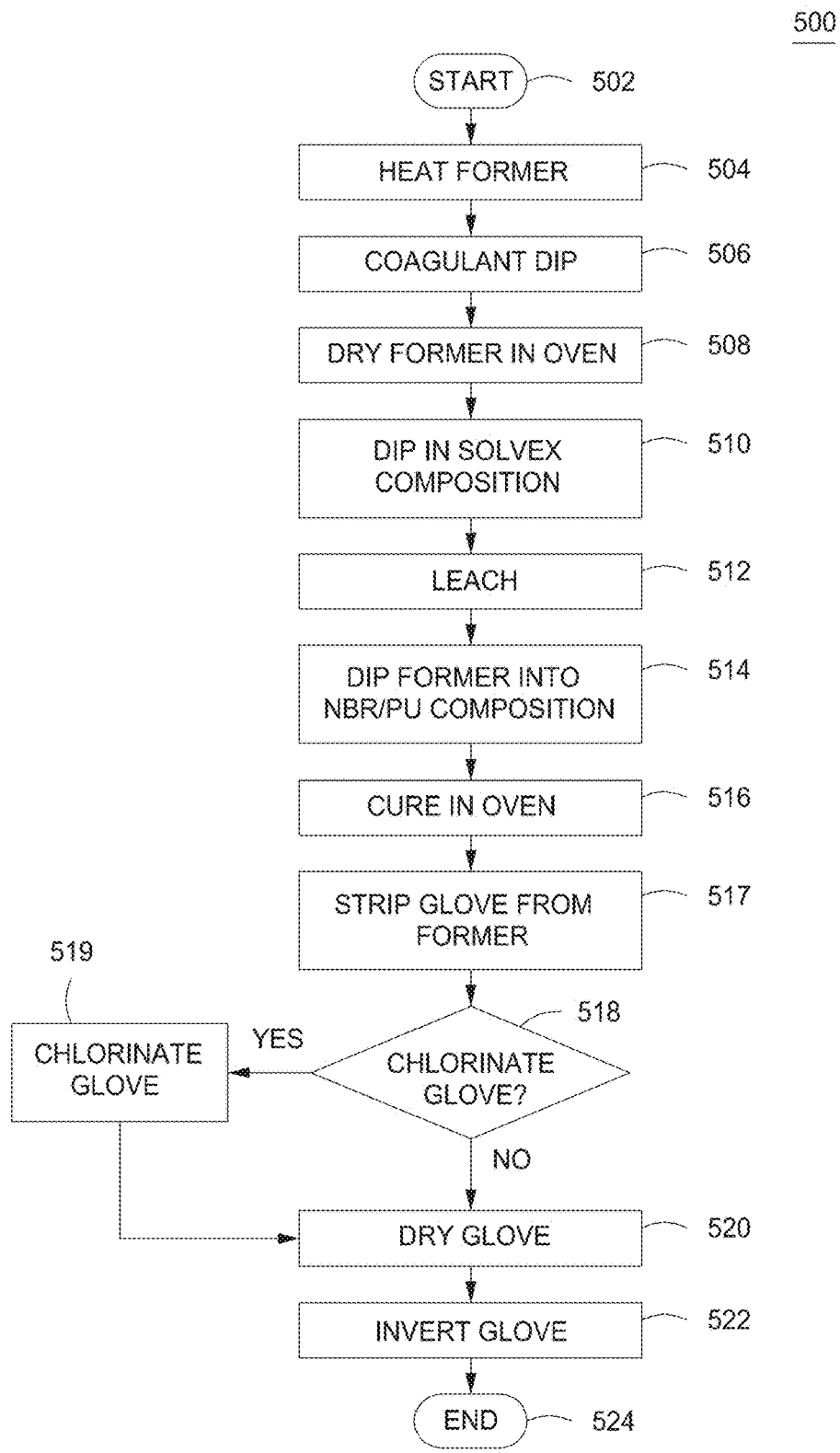
FIG. 5 depicts an exemplary flow diagram for a method for producing an unlined and/or unsupported glove according to embodiments of the invention.

FIG. 5 depicts an exemplary flow diagram for a method 500 for producing an unlined and/or unsupported glove according to embodiments of the invention. The method 500 begins at step 502 and proceeds to step 504, at which point a former is heated. In some embodiments, the former is heated to approximately 50-70° C. At step 506, the former has a coagulant applied thereon, such as a powdered coagulant or a liquid-solution based coagulant. The former is then dried, for example, in an oven at step 508. The method 500 proceeds to dipping the former into a composition, as shown in, for example, Table 4 at step 510 to form a first layer, after which it is leached in water at step 512.

The method 500 proceeds to step 514 at which point the former is dipped into an NBR/PU composition as described in, for example, Table 2. The former is removed from the composition and delivered to an oven at step 516, in which the first layer is cured. The first layer is cured, for example, at a temperature ranging between 90-130° C. In some exemplary embodiments, the first layer is cured at, for example, 120° C. for approximately one hour to form a glove. The glove is then stripped from the former at step 518, and optionally chlorinated. The glove is inverted at step 520 and dried in a dryer, for example, at 75° C. for approximately 45 minutes at step 522. The method 500 ends at step 524. It is to be noted that some steps may be omitted or added from the method 500. For example, the former need not be heated at step 504. Likewise, the glove may be optionally chlorinated following step 518. Also, other additional steps may be added, for example, applying a powder as an anti-tack agent within the coagulant, which can aid in stripping the gloves from the former.

Figure 6:
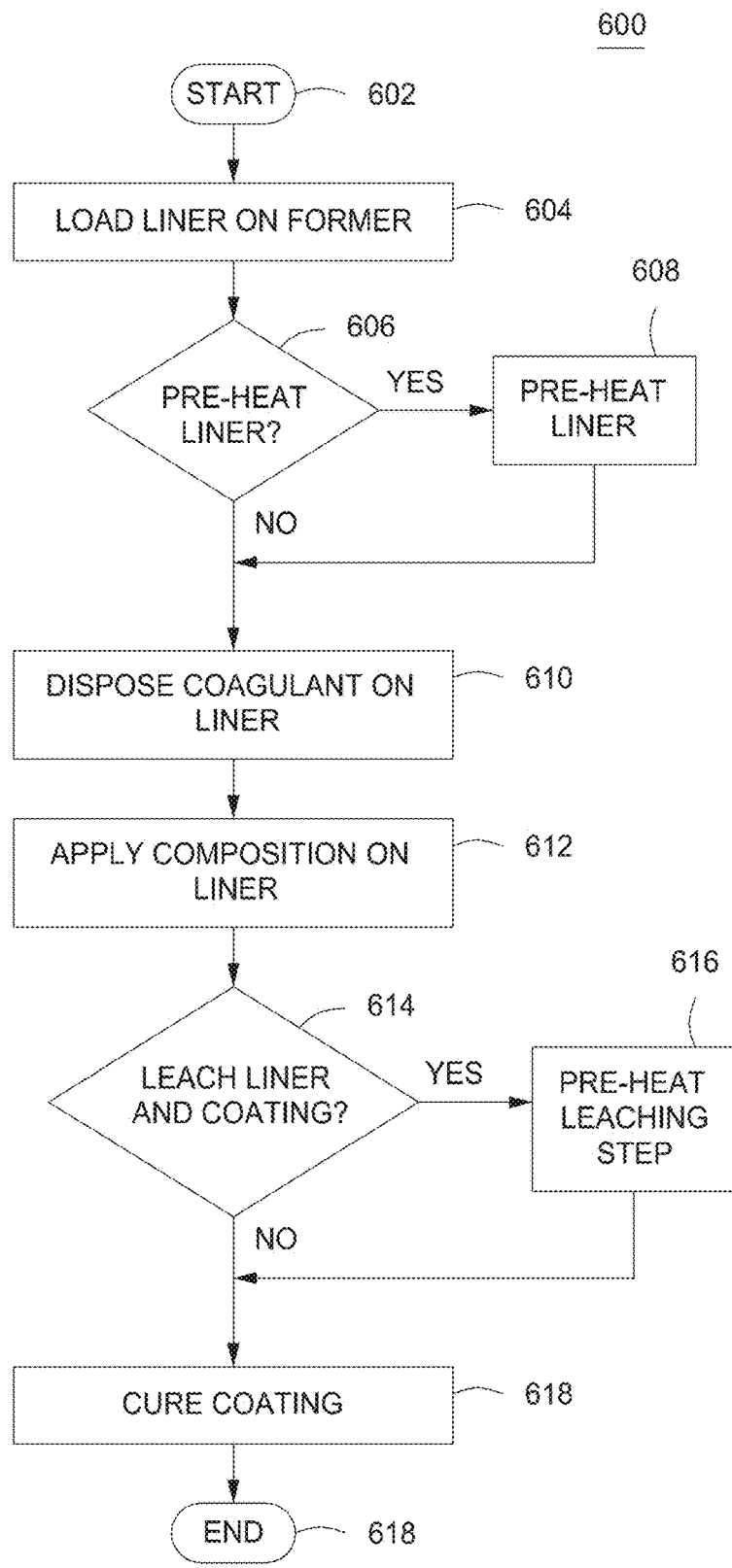
FIG. 6 depicts an exemplary flow diagram for a method for producing a foamed supported glove according to embodiments of the invention.

FIG. 6 depicts an exemplary flow diagram for a method 600 for producing a supported glove according to embodiments of the invention. The method 600 begins at step 602 and proceeds to step 604, at which point a fabric liner, for example, a 15- or 18-gauge knitted liner, is dressed on a former. In some embodiments, the former and liner are heated. For example, at step 606, a decision is made whether to heat the former and liner. If the answer is yes, at step 608, the liner and former are heated at approximately 50-70° C. At step 610, the former and liner are dipped in a coagulant bath, such as an aqueous or alcoholic solution of between 1.5-15% calcium nitrate with 0.1-1.0 citric acid, or has the coagulant solution sprayed thereon. In some exemplary embodiments of the invention, the coagulant is a 4.5-9% solution of calcium nitrate. The method 600 proceeds to step 612, wherein the former dressed with the liner is dipped into a nitrile-butadiene/polyurethane composition, as shown in, for example, Table 1, disposing a polymeric layer or coating thereon.

The method 600 proceeds to step 614 at which point a decision is made whether to leach the liner and coating. If the answer is no, the method 600 proceeds directly to step 618. If the answer is yes, the method 600 proceeds to step 616 where it is leached in an aqueous solution, such as hot water. At step 618, the polymeric layer/coating disposed on the liner is cured, for example, at a temperature ranging between, for example, 90-120° C. In some exemplary embodiments, the coating is cured in stages at different temperatures. In some exemplary examples, the coating is cured at, for example, 120° C. for approximately one hour. The method 600 proceeds to step 620 at which point the method 600 ends.

Figure 7:
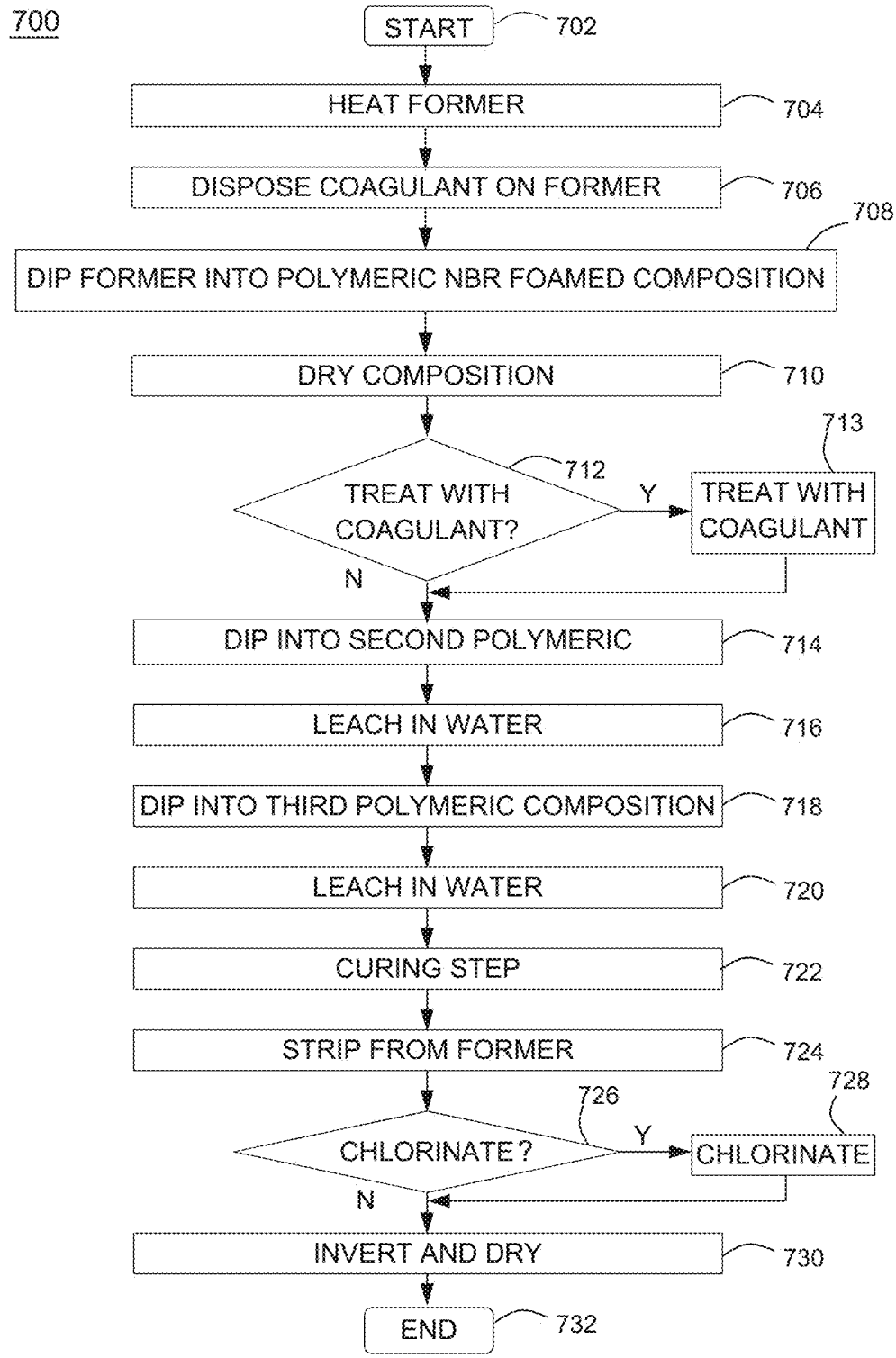
FIG. 7 depicts an exemplary flow diagram for a method for producing a foam-lined unsupported glove according to embodiments of the invention.

FIG. 7 depicts an exemplary flow diagram for a method 700 for producing a foam-lined unsupported glove according to embodiments of the invention. The method 700 begins at step 702 and proceeds to step 704, at which point a former is heated. In some embodiments, the former is heated to approximately 50-70° C., and is heated to 55° C. in at least one exemplary embodiment. At step 706, the former has a coagulant, such as a powdered coagulant, disposed thereon. The method 700 proceeds to step 708, at which point the former is dipped into a foamed polymeric, elastomeric, or latex composition, for example, a butadiene-nitrile composition or a blend of a polyurethane and butadiene-nitrile blend, such as in a composition described in Table 3, or optionally, a foamed composition, that further comprises, for example, one or more of natural rubber, butadiene-nitrile, polyurethane or blends thereof.

TABLE 3

| Type of component | Component used | Composition (% by weight) |
|---|---|---|
| Synthetic latex polymer | Carboxylated butadiene acrylonitrile latex | 90-100 |
| Synthetic latex polymer | Polyurethane | 0-10 |
| Stabilizer | Potassium hydroxide | 0.1-0.5 |
| Binder | Styrene maleic anhydride copolymer | 0.1-0.5 |
| Stabilizer | Sodium salts | 0.5-5.0 |
| Curative Agents | Cure package | 1.0-5.0 |
| Pigment (optional) | Grey | 0.1-0.5 |
| Thickener | Polyacrylate/methacrylic acid-acrylic ester copolymer/cellulose ether | 0.1-1.0 |

The method 700 proceeds to step 710, at which point the foamed composition disposed as a foam-lined coating on the former is delivered to an oven and partially dried at, for example, 60-80° C. for approximately two to five minutes. At step 712, the former having the foam-lined coating disposed is optionally treated with a coagulant. For example, a coagulant may be disposed by dipping into a coagulant solution, such as an aqueous solution between 5-15% calcium nitrate at step 713. In some exemplary embodiments of the invention, the coagulant is an 8% solution of calcium nitrate. The method 700 then proceeds to step 714.

At step 714, the former having the foam-lined coating disposed thereon is then dipped into a second polymeric composition, e.g., the polymeric composition described at Table 4, which comprises a pigment, as described, a green pigment, but can optionally be any color. At step 716, the former having the two polymeric layers disposed thereon is leached, for example, in hot water. At step 718, the former having the two polymeric layers is dipped into a third polymeric composition, such as the NBR/PU composition having the hard fillers and wax(es), as described in Table 2, forming another coating layer, which may be a palm dip, ¾ dip, or full dip. At step 720, the former and polymeric layers undergo another leaching step in hot water.

The former is removed from the composition and delivered to an oven at step 722, at which step the foam-lined and second polymeric coatings are cured. The coatings are cured, for example, at a temperature ranging between 90-130° C. In some exemplary embodiments, the coatings are cured at, for example, 120° C. for approximately one hour. The glove is then stripped from the former at step 724, and the method 700 proceeds to step 726 at which point a decision is made whether to chlorinate the glove. If the answer is yes, the glove is chlorinated at step 728. If the answer is no, the method 700 proceeds directly to step 730. The glove is then inverted and dried in a dryer, for example, at 75° C. for approximately 45 minutes at step 730. The method 700 ends at step 732. As with other methods, it is to be noted that some steps may be omitted from the method 700. Additional steps may be added, for example, applying a powder as an anti-tack agent within the coagulant, which can aid in stripping the gloves from the former or cleaning the formers before the start of the method, for example, with nylon brushes.

TABLE 4

| Type of component | Component used | Composition (% by weight) |
|---|---|---|
| Synthetic latex polymer | Carboxylated butadiene acrylonitrile latex | 100 |
| Stabilizer | Sodium salts/potassium hydroxide | 0.4-1.6 |
| Defoamer | Defoamer | 0.05-0.65 |
| Curative Agents | Cure package | 4-9 |
| Pigment | Titanium oxide and green paste | 0.5-2.0 |
| Thickener | Styrene maleic anhydride copolymer | 0.2-1.0 |

Figure 8:
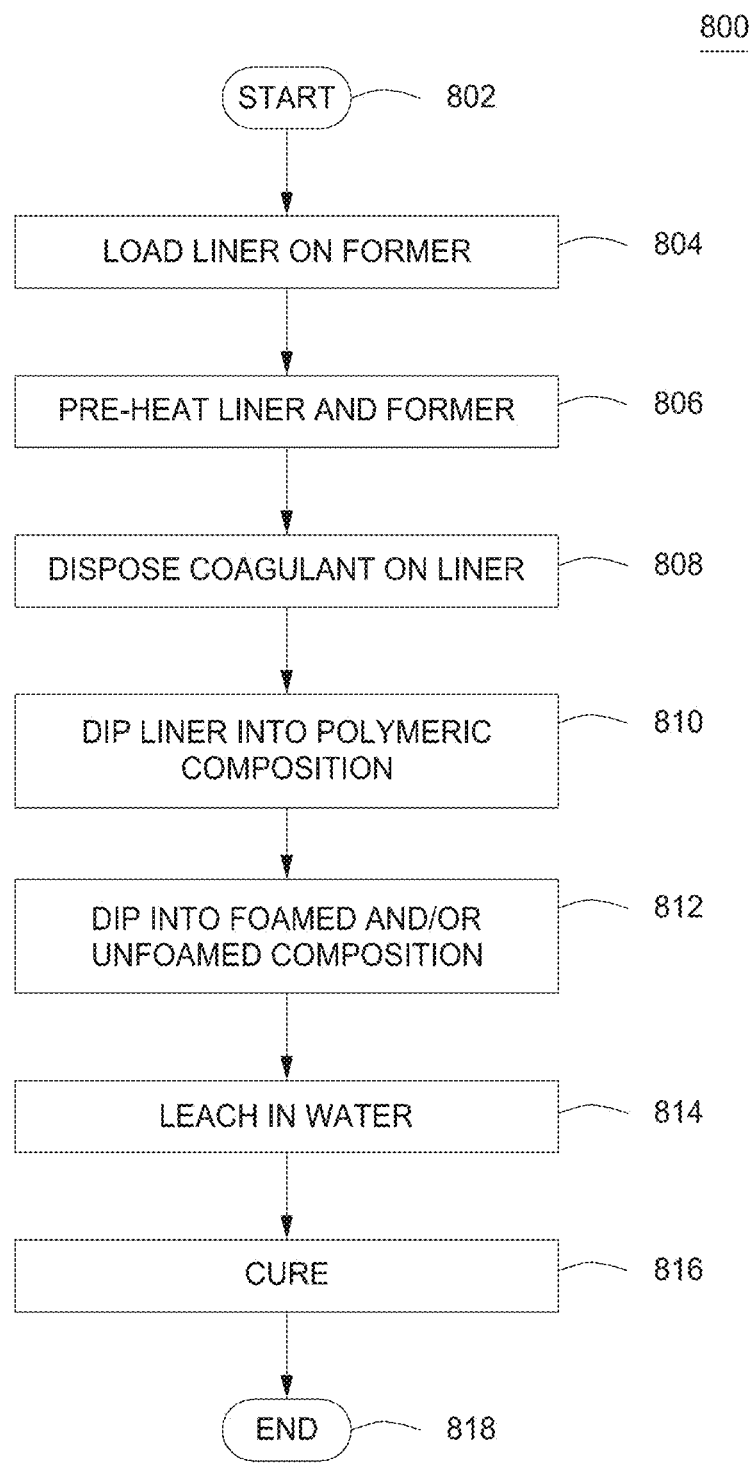
FIG. 8 depicts an exemplary flow diagram for a method for producing a supported glove having two polymeric layers, according to embodiments of the invention.

FIG. 8 depicts an exemplary flow diagram for a method 800 for producing a supported glove having two polymeric layers, according to embodiments of the invention. The method 800 begins at step 802 and proceeds to step 804, at which point a fabric liner, such as a knitted fabric liner, is loaded onto a former. At step 806, the liner and/or former are pre-heated to approximately 50-70° C. At step 808, a coagulant is disposed on the liner. The method 800 proceeds to step 810, at which step the former and the liner are dipped into a composition, as shown in, for example, Table 1, to form an ungelled, i.e., uncured, first polymeric layer on the liner, after which a second polymeric layer, which may be foamed or unfoamed, is disposed at step 812.

The method 800 proceeds to step 814 at which step the polymeric layer(s) are leached using room temperature or hot water. The former and the liner having the polymeric layer(s) are then delivered to an oven at step 816, in which the polymeric layer(s) is cured. The polymeric layer(s) is cured, for example, at a temperature ranging between 90-130° C. In some exemplary embodiments, the polymeric layer(s) is cured at, for example, 120° C. for approximately one hour. The method 800 ends at step 818. It is to be noted that some steps may be omitted from the method 800. For example, the former and liner need not always be pre-heated at step 806.

Figure 9:
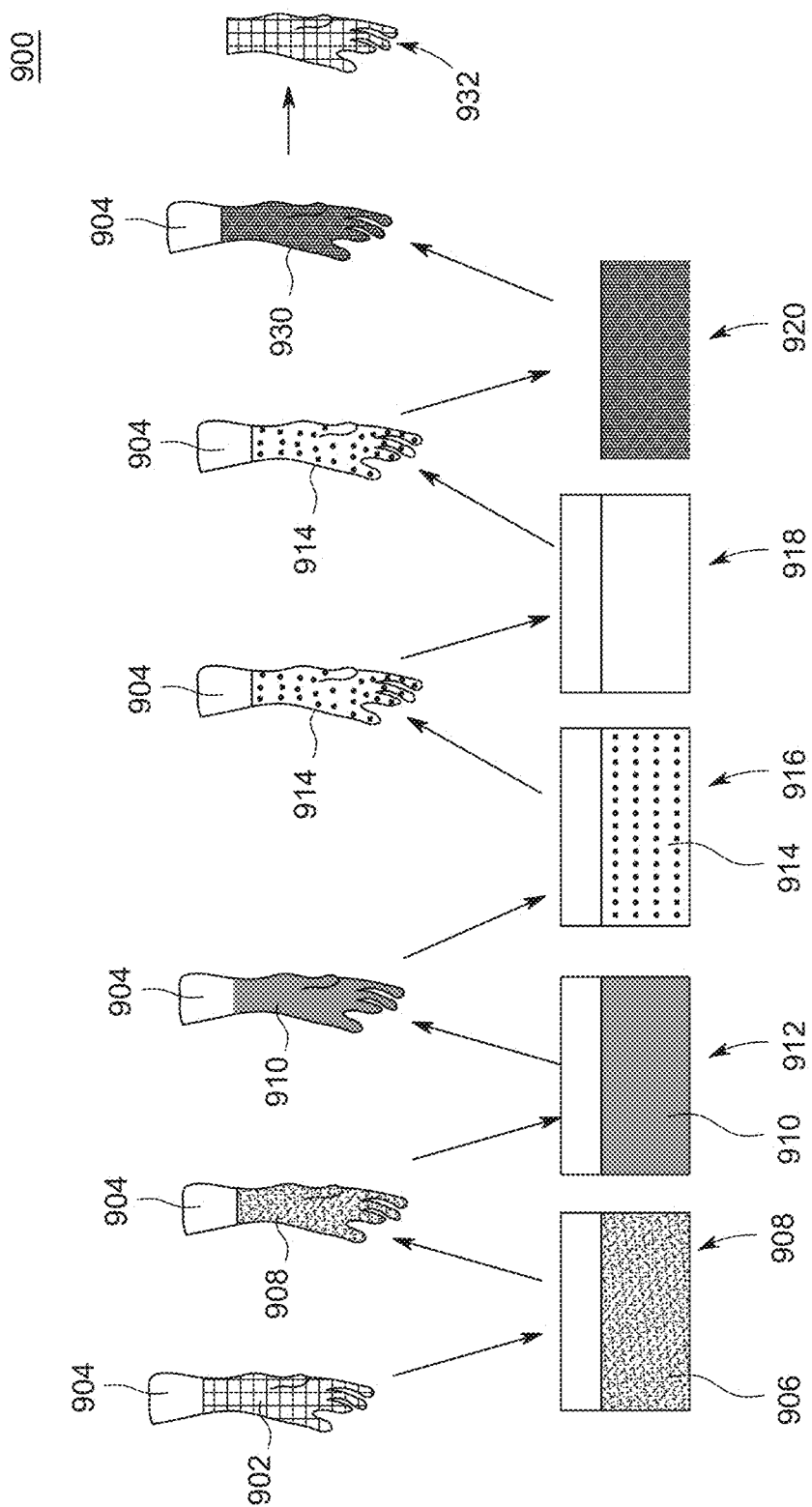
FIG. 9 depicts a diagram for a method and apparatus for producing a supported glove having two polymeric layers, according to embodiments of the invention.

FIG. 9 depicts a diagram for a method and apparatus 900 for producing a supported glove having two polymeric layers, according to embodiments of the invention. The apparatus 900 comprises a former 904, upon which a knitted liner 902 is dressed. The former 904 having the knitted liner 902 dressed thereon is dipped into a tank 908 containing a coagulant 906 as described herein. Embodiments of the invention also comprise a knitted liner 902 and former 904 that is heated, for example, pre-heated to approximately 50-70° C., before dipping into the tank 908. The former 904 having the knitted liner 902 dressed thereon and with the coagulant 906 disposed on the liner is removed from the tank 908.

The former 904 having the knitted liner 902 dressed thereon and with the coagulant 906 disposed on the knitted liner 902 is then dipped into a tank 912, containing a first polymeric composition 910, such as described in Table 1, and is removed therefrom. The former 904 having the liner 902, which now has the first polymeric composition 910 disposed thereon, is dipped into a tank 916 containing a second polymeric composition 914, such as described in Tables 1-3. Embodiments of the invention comprise wherein the tank 916 contains the same polymeric composition, or wherein the second polymeric composition 914 is different than the first polymeric composition 910. At least one exemplary second polymeric composition 914 is a foamed composition, as shown in, for example, Table 2, to form an ungelled, i.e., uncured, second polymeric composition 914 on the first polymeric composition 910.

The former 904 having the knitted liner 902 and the first polymeric composition 910 and the second polymeric composition 914 disposed thereon is leached using room temperature or hot water in tank 918. The former and the liner having the first polymeric composition 910 and second polymeric composition 914 disposed as polymeric layer(s) is then delivered to an oven 920, in which the polymeric layer(s) are cured to form a glove 930. The polymeric layer(s) is cured, for example, at a temperature ranging between 90-130° C. In some exemplary embodiments, the polymeric layer(s) is cured at, for example, 120° C. for approximately one hour. Optionally, the glove 930 is inverted to glove 932.

Gloves made according to embodiments of the inventions were tested for physical properties. A bar grip test measures the grip force required to lift a steel weight having a polished surface and covered or not with a mixture of hydraulic oil and grease. A test bar with sensors inside that detects the grip force (units in kgf) is connected at one end by a cable that passes over and is suspended from an overhead pulley and then down to a bucket container on the floor. The bucket is filled with water to provide a certain load, e.g., of 2.5 kg, 4.5 kg, or 6.5 kg. A tester wearing a glove specimen grasps a test bar to provide secure contact and grip so that a certain load (2.5 kg, 4.5 kg, or 6.5 kg) can be lifted. The grip force applied on the test bar is then displayed, e.g., on the PD-100 Digital Indicator. The test bar and gloves are covered with water or oil when performing wet and oil grip test respectively.

Test Method

I. If a wet or oil test, 5 mL of water or oil (Shell Rimula X 15W-40 oil) is used to coat the glove specimen, and the coated glove is rubbed on a test bar to wet or oil coat it.

a) A bucket is placed on a 30 kg balance and filled with tap water to provide the test weight (e.g., 4.5 kg).

b) The tester uses ideally the same hand to grasp the test bar wearing the test glove specimen. The tester grips the apparatus at right angles to the surfaces of the test bar using the thumb and the first finger (or second finger) only.

c) A gloved hand applies sufficient grip force to a test bar to provide secure contact and grip so with a downward movement of the tester's arm, a weight can be lifted.

d) The grip force (in kgf) applied on the test bar is displayed on the PD-100 Digital Indicator in two decimal places.

e) The test is repeated at a given load.

Supported Gloves.

With a 2.5 kg load, the average grip force dry is approximately 0.46 kgf for the immediate collapsed foam. With the oil coating, the average is 0.94 kgf for the immediate collapsed foam. With the wet coating, the average is 0.60 kgf. With a 4.5 kg load, the average grip force wet is approximately 1.40 kgf for the immediate collapsed foam. With a 4.5 kg load, the average grip force dry is approximately 1.18 kgf for the immediate collapsed foam. With the oil coating, the average is 2.05 for the immediate collapsed foam. With a 4.5 kg load, the average grip force wet is approximately 1.40 kgf for the immediate collapsed foam. With a 6.5 kg load, the average grip force dry is approximately 2.36 kgf for the immediate collapsed foam. With the oil coating, the average is 3.38 for the immediate collapsed foam. With a 6.5 kg load, the average grip force wet is approximately 2.52 kgf for the immediate collapsed foam.

Unsupported Gloves.

With a 4.5 kg load, the average grip force dry is approximately 1.29 kgf for the delayed collapsed foam. With a 4.5 kg load, the average grip force engine oil is 2.28 kgf for the delayed collapsed foam. With the liquefied chicken fat oil coating, the average is 1.41, for fish oil the average is 1.32 and for olive oil, the average is 1.44 for the delayed collapsed foam. With a 4.5 kg load, the average grip force dry is approximately 1.29 kgf for the immediate collapsed foam. With the engine oil coating, the average is 2.31, the average is 1.78 for liquefied chicken fat oil, 1.48 for fish oil, and 1.51 for olive oil for the immediate collapsed foam.

Using the EN 388 test for EN abrasion resistance, the gloves, whether manufactured as a delayed collapse foam or an immediate collapsed foam, have an EN abrasion resistance of 20,000 cycles or even much greater, for gloves having an average coating thickness of 0.05 to 0.5 mm for supported gloves, regardless of the type of thickness of the fabric liner.

As described herein, a glove is defined as any five-fingered article that is worn on the hand, for example, a supported glove or an unsupported glove. A supported glove is a fabric liner having a polymeric or elastomeric coating disposed thereon. A liner is defined as, for example, a fabric glove (whether woven, non-woven, or knitted) having no elastomeric or polymeric composition disposed thereon, i.e., an unsupported glove. The terms glove and liner may be used interchangeably herein. Also, an unsupported glove can be unlined, foamlined, or flocklined. For example, a foamlined glove comprises a glove having a first polymeric layer and a second polymeric layer, where the first polymeric layer is an inner foamed latex coating. A flocklined glove comprises an inner polymeric layer containing flocks either by a pneumatic flocking system (conventional type) or by dipping (this is also known as dip-able flocking system) into a polymeric composition having flock mixed therein or thereon. An unlined glove comprises no foamed layer and no flock inside or on the glove, i.e., a single layer glove.

Although only a few exemplary embodiments of the present invention have been described in detail above, those skilled in the art will readily appreciate that many modifications are possible in the exemplary embodiments without materially departing from the novel teachings and advantages of this invention. For example, the soap treatment described above may be applied to any glove described herein, i.e., any supported glove having a fabric liner or any unsupported glove.

All ranges recited herein include ranges therebetween, and can be inclusive or exclusive of the endpoints. Optional included ranges are from integer values therebetween (or inclusive of one original endpoint), at the order of magnitude recited or the next smaller order of magnitude. For example, if the lower range value is 0.2, optional included endpoints can be 0.3, 0.4 . . . 1.1, 1.2, and the like, as well as 1, 2, 3 and the like; if the higher range is 8, optional included endpoints can be 7, 6, and the like, as well as 7.9, 7.8, and the like. One-sided boundaries, such as 3 or more, similarly include consistent boundaries (or ranges) starting at integer values at the recited order of magnitude or one lower. For example, 3 or more includes 4 or more, or 3.1 or more.

Publications and references, including but not limited to patents and patent applications, cited in this specification are herein incorporated by reference in their entirety in the entire portion cited as if each individual publication or reference were specifically and individually indicated to be incorporated by reference herein as being fully set forth.

The foregoing description of embodiments of the invention comprises a number of elements, devices, machines, components and/or assemblies that perform various functions as described. These elements, devices, machines, components and/or assemblies are exemplary implementations of means for performing their respectively described functions. While the foregoing is directed to embodiments of the present invention, other and further embodiments of the invention may be devised without departing from the basic scope thereof.

What is claimed is:

1. A glove, comprising:
    a cured aqueous polymeric, elastomeric, or latex emulsion including a blend of a polyurethane material, an acrylonitrile-butadiene material and an ethylene vinyl acetate material;
    at least one of a carnauba wax, an alloy wax, or a modified polyethylene wax disposed in the emulsion; and
    hard filler particles having a hardness greater than 4 Mohs, ranging in amount from 2-10% by weight and disposed within the emulsion, wherein an EN388 abrasion resistance of the glove is at least level 4.

2. The glove of claim 1, wherein the cured aqueous polymeric, elastomeric, or latex emulsion comprises the ethylene vinyl acetate material in an amount of 1-4% by weight.

3. The glove of claim 1, wherein the hard filler particles comprise at least one of boron carbide, boron nitride, silicon carbide, aluminum potassium silicates, or aluminum oxide.

4. The glove of claim 1, wherein the hard filler particles are irregular in shape and have a diameter of 0.1 to 10 microns.

5. The glove of claim 1, wherein the blend comprises an aqueous polyurethane or at least one highly carboxylated acrylonitrile-butadiene material.

6. The glove of claim 1, wherein the cured aqueous polymeric, elastomeric, or latex emulsion comprises a foamed or an unfoamed emulsion.

7. The glove of claim 6, wherein the cured aqueous polymeric, elastomeric, or latex emulsion is foamed and comprises a structure having one of small open cells or large open cells, wherein the small open cells are 0.01-0.40 mm in size and the large open cells are 0.07-0.70 mm in size.

8. The glove of claim 7, wherein the foamed emulsion is an immediate or delayed collapsed foam.

9. The glove of claim 1, wherein the EN388 abrasion level of the glove is 20,000 cycles or more.

10. The glove of claim 1, further comprising a knitted fabric liner, wherein the cured aqueous polymeric, elastomeric, or latex emulsion is disposed as a first coating on the knitted fabric liner.

11. The glove of claim 10, further comprising a second coating disposed on the first coating.

12. A glove, comprising:
- a cured aqueous polymeric, elastomeric, or latex emulsion including a blend of a polyurethane material, an acrylonitrile-butadiene material and an ethylene vinyl acetate material;
- at least one of a natural wax, synthetic wax, alloy wax, or a modified polyethylene wax disposed in the cured emulsion; and
- hard filler particles having a hardness greater than 4 Mohs, ranging in amount from 2-10% by weight and disposed within the emulsion wherein the glove comprises an EN 388 abrasion resistance of level 4.

13. The glove of claim 12, wherein the cured aqueous polymeric, elastomeric, or latex emulsion comprises the ethylene vinyl acetate material in an amount of 1-4% by weight.

14. The glove of claim 12, wherein the hard filler particles comprise at least one of boron carbide, boron nitride, silicon carbide, aluminum potassium silicates, or aluminum oxide.

15. The glove of claim 12, wherein the hard filler particles are irregular in shape and have a diameter of 0.1 to 10 microns.

16. A glove, comprising:
- a cured aqueous polymeric, elastomeric, or latex emulsion including a blend of a polyurethane material in an amount of 1-5% by weight, a carboxylated butadiene-acrylonitrile latex in an amount of 91-98% by weight and an ethylene vinyl acetate material in an amount of 1-4% by weight;
- at least one of a natural wax, synthetic wax, alloy wax, or a modified polyethylene wax disposed in the cured emulsion; and
- hard filler particles having a hardness greater than 4 Mohs, ranging in amount from 2-10% by weight and disposed within the emulsion wherein the glove comprises an EN 388 abrasion resistance of level 4.

\* \* \* \* \*